(12) United States Patent
Kreiner et al.

(10) Patent No.: US 11,042,456 B2
(45) Date of Patent: *Jun. 22, 2021

(54) KINETICALLY ACTIVATED DIAGNOSTICS AND CORRECTION

(71) Applicant: AT&T Intellectual Property I, L.P., Atlanta, GA (US)

(72) Inventors: Barrett M. Kreiner, Woodstock, GA (US); Jonathan L. Reeves, Roswell, GA (US); Ryan Schaub, Peachtree Corners, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,818

(22) Filed: Jan. 7, 2020

(65) Prior Publication Data

US 2020/0142796 A1 May 7, 2020

Related U.S. Application Data

(63) Continuation of application No. 14/980,261, filed on Dec. 28, 2015, now Pat. No. 10,552,281.

(51) Int. Cl.
| | |
|---|---|
| *G06F 11/27* | (2006.01) |
| *G06F 11/273* | (2006.01) |
| *H01J 7/34* | (2006.01) |
| *H01J 7/00* | (2006.01) |
| *H02J 7/34* | (2006.01) |
| *H02J 7/00* | (2006.01) |

(52) U.S. Cl.
CPC .......... *G06F 11/27* (2013.01); *G06F 11/273* (2013.01); *H02J 7/0029* (2013.01); *H02J 7/0047* (2013.01); *H02J 7/34* (2013.01)

(58) Field of Classification Search
None
See application file for complete search history.

(56) References Cited

U.S. PATENT DOCUMENTS

| | | |
|---|---|---|
| 7,072,648 B2 | 7/2006 | Ichikawa |
| 7,886,189 B2 | 2/2011 | Mori et al. |
| 7,890,095 B2 | 2/2011 | Cho |
| 8,457,623 B2 | 6/2013 | Keum et al. |
| 8,934,866 B2 | 1/2015 | Parmar et al. |
| 8,958,771 B2 | 2/2015 | Flynn et al. |
| 2004/0203726 A1 | 10/2004 | Wei |
| 2009/0281771 A1 | 11/2009 | Liu et al. |
| 2011/0109170 A1 | 5/2011 | Chen et al. |
| 2012/0157073 A1 | 6/2012 | Kim et al. |
| 2013/0246285 A1 | 9/2013 | Chayun et al. |
| 2014/0024348 A1 | 1/2014 | Hurst et al. |
| 2015/0097690 A1 | 4/2015 | Ady et al. |
| 2016/0109948 A1 | 4/2016 | Jeong et al. |

FOREIGN PATENT DOCUMENTS

| | | |
|---|---|---|
| CN | 102915031 A | 2/2013 |
| JP | H06169285 A | 6/1994 |
| WO | 2014169645 A1 | 10/2014 |

*Primary Examiner* — Roy Y Yi
(74) *Attorney, Agent, or Firm* — Amin, Turocy & Watson, LLP (57) ABSTRACT

A kinetically activated method and device for initiating self-diagnostics in a variety of hardware devices to enable proactive detection and correction of faults, errors, malfunctions, failures and the like.

20 Claims, 5 Drawing Sheets

KINETICALLY ACTIVATED DIAGNOSTICS AND CORRECTION

CROSS-CITE TO RELATED APPLICATIONS

This application is a Continuation of, and claims priority to, U.S. Utility patent application Ser. No. 14/980,261 (now U.S. Pat. No. 10,552,281), filed Dec. 28, 2015, the entire contents of which application are incorporated by reference disclosed herein.

TECHNICAL FIELD

The present invention relates generally to hardware device faults and, more particularly, to a technique for kinetically activated diagnostics providing fault detection and correction in hardware devices.

BACKGROUND OF THE INVENTION

In today's technologically driven environment, people are becoming more and more reliant on devices and equipment that allow access to all types of services, applications, networks, and other capabilities. Technological advances have enabled the ubiquitous deployment of devices amongst consumers of all socio-economic classes. The consumers rely upon these devices for continuous access to television content, broadband connectivity, social media, and communications, to name just a few.

Of course, as with any technology, such hardware devices can and will be subject to periodic malfunctions, faults, errors and failures which can tend to frustrate the user of the hardware device depending upon the frequency of occurrence and/or the severity. In turn, human nature and habit sometimes manifest in the user's action of physically striking, shaking or throwing a malfunctioning device with the desire of correcting the current problem with the device. For example, smaller devices (e.g., handheld) might be shaken vigorously or hit against a more massive object (e.g., a tabletop), while larger devices might be stricken with the user's hand or foot, all in the hope of correcting the device malfunction in an immediate way. In the end, the user is still without knowledge of why or how the problem was corrected or persists. That is, if striking the device corrects the problem, the user has no idea why or how this action was effective in correcting the problem and/or whether the fix is temporary or permanent. Alternatively, if striking the device does not correct the problem, the user still has no idea why or how the device failed and is still left with a failed device on hand.

However, before dismissing the shortcomings of such human behavior it may be worthwhile to leverage this human conditioning effect to identify a way for hardware devices to initiate self-diagnostics to improve their performance and operational sustainability.

BRIEF SUMMARY OF THE EMBODIMENTS

In accordance with various embodiments, a kinetically activated method and device is provided for initiating self-diagnostics in a variety of hardware devices to enable proactive, real-time detection and correction of faults, errors, malfunctions, failures and the like.

More particularly, in accordance with an embodiment, an integrated circuit is configured with functionality to include a kinetic generator (e.g., one or more sensors such as an omnidirectional g-force sensor or accelerometer), a processor, a diagnostic support services controller and communications interface for connectivity to a plurality of device failure points and other communications capabilities (e.g., Bluetooth® communications), a kinetic energy harvester and an energy buffer. Illustratively, the integrated circuit and the associated functionality is embedded with an existing integrated circuit of the hardware device to enable self-diagnostics, or as an independent integrated circuit of such hardware device.

In accordance with an embodiment, the self-diagnostic enabled hardware device will sense via the embedded integrated circuit a particular shock, impact, vibration or the like and initiate a self-diagnostic routine. Illustratively, the self-diagnostics may be initiated from an excessive force generated by a particular event that the hardware device is subjected to, for example, the dropping of a set-top box remote control or a Bluetooth®-enabled headset receiving a sudden blow. In accordance with an embodiment, a directional sensor is able to determine the direction and/or the strength of a particular shock force to with the device is subjected at any given time. That is, the directional sensor is specifically looking for a stochastic or coherent force application to the device. Further, the sensor may be equipped with one or more buffers (or have access to a memory) to retain a history of past force application(s) to the device which will be useful in distinguishing between inadvertent and intentional applications of force in accordance with the embodiments herein. For example, the force history may be utilized to set a specified impact/force threshold which must be exceeded before self-diagnostics is triggered. In this way, the device may be constantly monitored for the application of any force (including, for example, a force above a specified threshold) including but not limited to impact strength/force level, direction, orientation, and/or torque/rotation, to name just a few. As such, self-diagnostics are enabled, in accordance with the embodiment, in hardware devices that may not have access to diagnostic capabilities in a more centralized way (e.g., a wireless handset that communicates via a 4G wireless network that may provide continual fault detection capabilities to 4G connected devices).

In accordance with an embodiment, the self-diagnostically enabled hardware device will upon activation of the self-diagnostics initiate either routine maintenance operations to prevent future faults or, in the event of a fault, initiate self-repair routines to correct or recover from the fault. In these situations, the hardware device subjected to the fault broadcasts at least one diagnostic message to other hardware devices proximate to such hardware device (e.g., via a Bluetooth ad-hoc network) and these other hardware devices (which may be the same type of device or different type of device) will receive the diagnostic message and broadcast back a message that will include an indication of the type of fault identified and/or a solution to recover from the fault or an indication that no solution is available.

In accordance with an embodiment, as noted above, self-diagnostically enabled hardware device includes a kinetic energy harvester (e.g., a piezoelectric energy harvesting device) and an energy buffer (e.g., a high-capacity capacitor) which may be used to collect and store impact energy (e.g., from an impact on or to self-diagnostically enabled hardware device) for powering the device. In accordance with an embodiment, the kinetic energy harvester is configured with at least one omnidirectional g-force sensor for sensing the impact(s)/shock(s) to the device. This is particularly effective if self-diagnostically enabled hardware device is a low power device and experiences a depleted power condition or when external power sources are unavailable.

DETAILED DESCRIPTION

In accordance with various embodiments, a kinetically activated method and device is provided for initiating self-diagnostics in a variety of hardware devices to enable proactive, real-time detection and correction of faults, errors, malfunctions, failures and the like.

Figure 1:
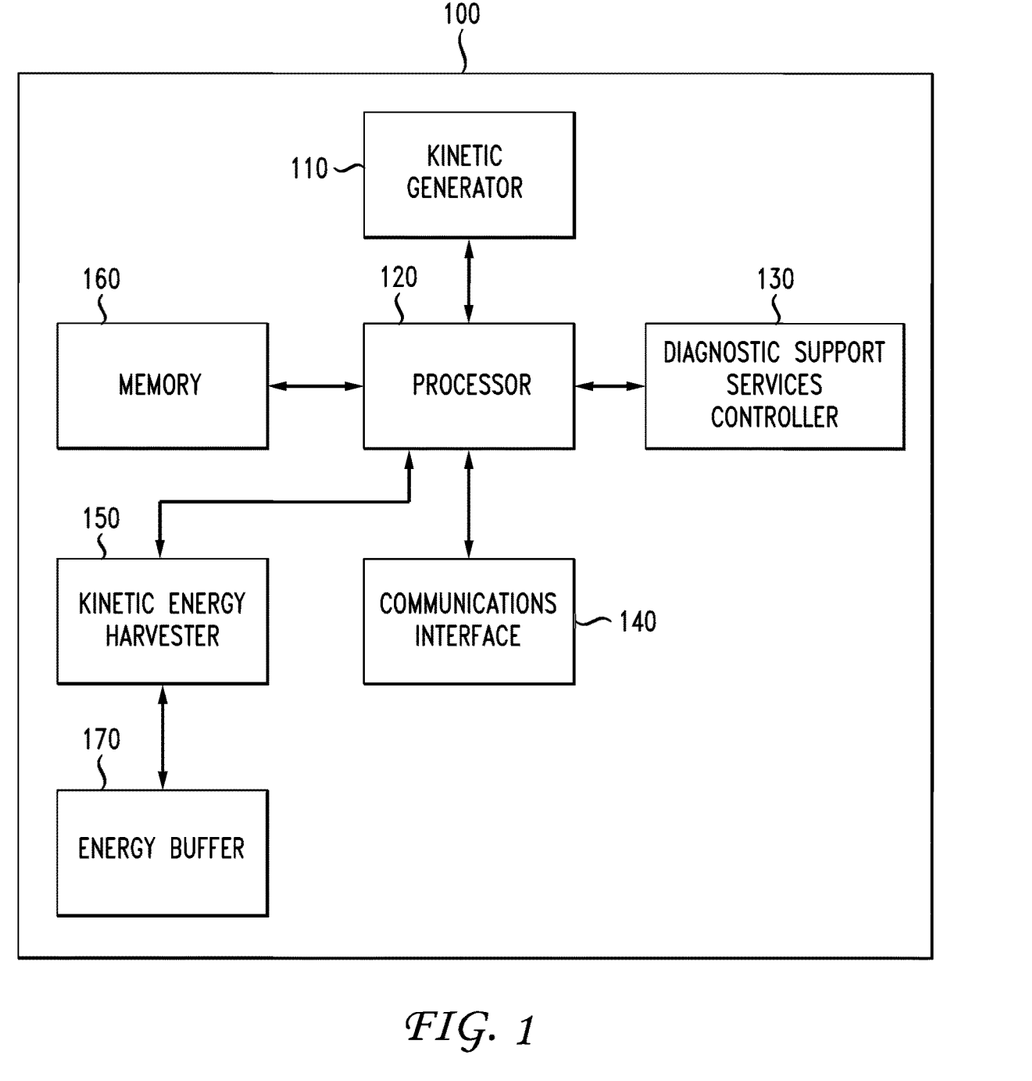
FIG. 1 shows a high-level block diagram of a self-diagnostic support device configured in accordance with an illustrative embodiment.

FIG. 1 shows a high-level block diagram of self-diagnostic support device 100 configured in accordance with an illustrative embodiment. More particularly, in accordance with the embodiment, self-diagnostic support device 100 includes processor 120 that is configurable to perform self-diagnostic actions for hardware devices in accordance with the various embodiments described herein including performing data processing, application/firmware execution and other processing and management services. In some embodiments, self-diagnostic support device 100 may comprise one or more independent integrated circuits (e.g., a single chip, chip set and/or system on a chip) which are assembled and integrated with a hardware device configured with kinetically activated self-diagnostics as detailed herein below. In other embodiments, the functionality of self-diagnostic support device 100 may be embedded directly in existing integrated circuit(s) of the hardware device thereby eliminating the need for an independent integrated circuit(s).

Processor 120 may include both general and special purpose microprocessors, and may be a sole processor or one of multiple processors. Processor 120 may comprise one or more central processing units (CPUs), for example. Processor 120, diagnostic support services controller 130, and/or memory 160 may include, be supplemented by, or incorporated in, one or more application-specific integrated circuits (ASICs) and/or one or more field programmable gate arrays (FPGAs).

In accordance with an embodiment, self-diagnostic support device 100 is configured with kinetic generator 110 which may be configured as one or more sensors such as an omnidirectional g-force sensor, accelerometer, solid state shock sensors, mechanical sensor, piezoelectric device, and/ or other devices that convert shocks, vibrations, impacts and/or motion to an electric current or other detectable signal output. In accordance with an embodiment, self-diagnostic support device 100 will sense via kinetic generator 110 whether a particular hardware device is subject to one or more shock(s), impact(s), vibration(s), motion(s) or the like and initiate a self-diagnostic routine stored in memory 160, for example, and executed by processor 120. Illustratively, the self-diagnostics may be initiated from an excessive force generated by a particular impact event that the hardware device is subjected to, for example, the dropping of set-top box remote control or a Bluetooth®-enabled headset receiving a sudden blow. As such, self-diagnostics are enabled, in accordance with the embodiment, in hardware devices that may not have access to diagnostic capabilities in a more centralized way. In accordance with an embodiment, kinetic generator 110 is a directional sensor is able to determine the direction and/or the strength of a particular shock force to self-diagnostic support device 100. That is, the directional sensor is specifically looking for a stochastic or coherent force application to self-diagnostic support device 100. Further, the kinetic generator 110 may be equipped with one or more buffers or have access to a memory (e.g., memory 160) to retain a history of past force application(s) to self-diagnostic support device 100 which will be useful in distinguishing between inadvertent and intentional applications of force in accordance with the embodiments herein. For example, the force history may be utilized to set a specified impact/force threshold which must be exceeded before self-diagnostics is triggered. In this way, the device may be constantly monitored for the application of any force (including, for example, a force above a specified threshold) including but not limited to impact strength/force level, direction, orientation, and/or torque/ rotation, to name just a few.

Figure 2:
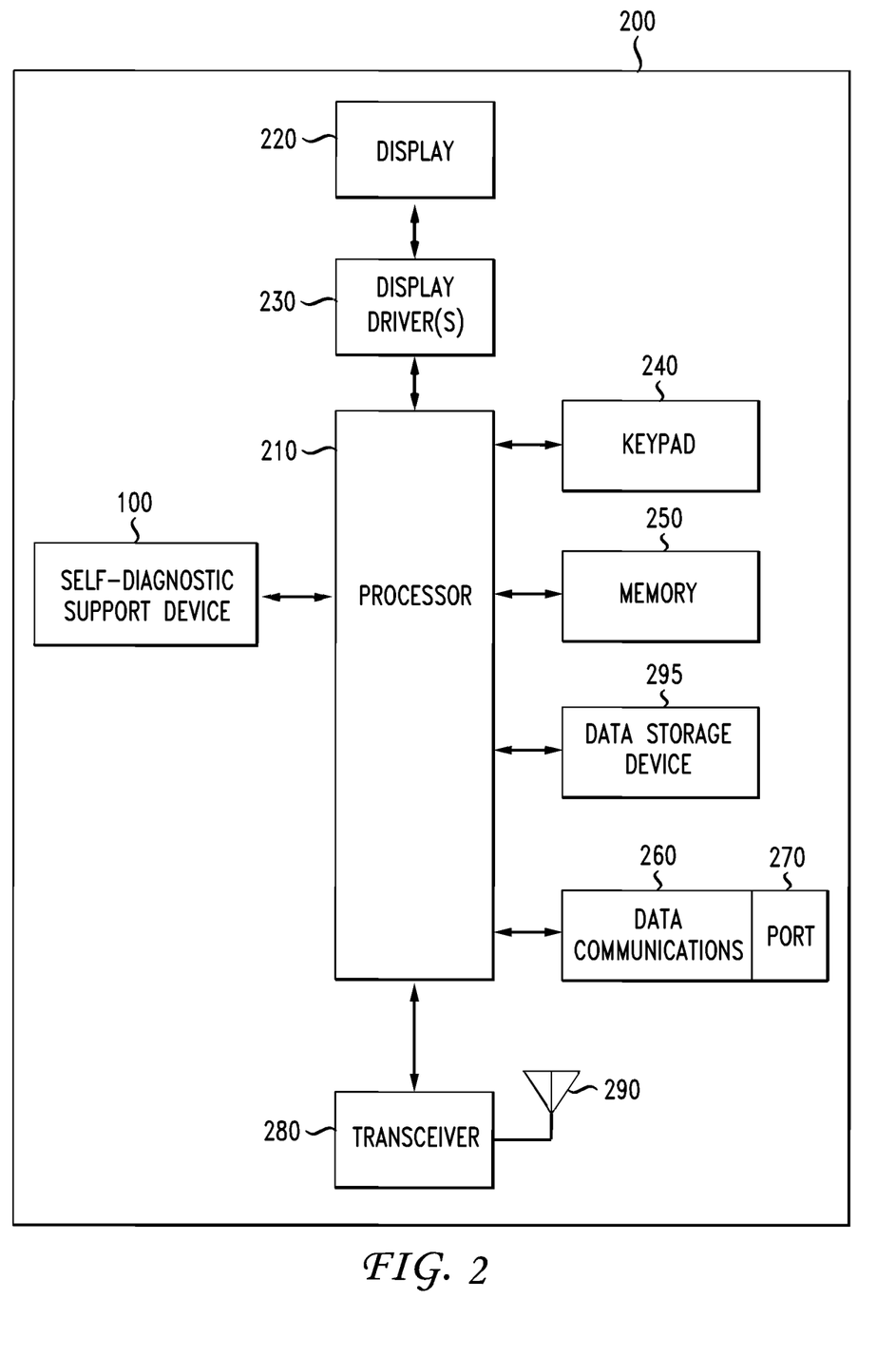
FIG. 2 shows a high-level block diagram of a portable electronic device configured with the self-diagnostic support device of FIG. 1 in accordance with an illustrative embodiment.

Turning now to a discussion of both FIG. 1 and FIG. 2, FIG. 2 shows a high-level block diagram of a portable electronic device 200, an illustrative hardware device, configured in accordance with an illustrative embodiment. In particular, processor 210 controls the general operations of portable electronic device 200 and is interfaced with self-diagnostic support device 100 which provides kinetically activated self-diagnostics to enable proactive detection and correction of faults, errors, malfunctions, failures and the like (as detailed herein above) in portable electronic device 200. In accordance with an embodiment, diagnostic support services controller 130 is utilized to facilitate device self-diagnostics for portable electronic device 200 in order to identify potential faults or malfunctions that may affect the operability of the device. For example, diagnostic support services controller 130 may be interfaced with and/or connected to identified or known failure points of portable electronic device 200 (e.g., Wi-Fi connection, connector interfaces, power connections, etc.) to facilitate the self-diagnostics either directly or indirectly with respect to such identified failure points which are susceptible to operational faults.

For example, the device self-diagnostics may be used to diagnosis a current fault already affecting portable electronic device 200 or to predict a probability of the occurrence of some future fault which will adversely affect portable electronic device 200. In delivering the self-diagnostics in accordance with the embodiment, device diagnostics may be performed based on a knowledge database (e.g., as stored in memory 160), fault profiles (e.g., as stored in memory 160) that may comprise information regarding device configurations, device settings, usage characteristics and the like, and/or other self-diagnostic information otherwise accessible to portable electronic device 200, for example using communications interface 140 to access information stored remotely to the device.

As will be appreciated, the detailed discussion with respect to portable electronic device 200 is illustrative in nature to further the understanding of the kinetically activated self-diagnostics facilitated by this embodiment, however, the scope of the embodiments herein are intended to include any device, apparatus, equipment, vehicle or other hardware, whether portable or not, that would benefit from such kinetically activated self-diagnostics. By way of example but not limitation such devices may include wireless handsets, set-top boxes, personal/digital video recorders, interactive televisions, tablet computers, desktop computers, watches, radios, game controllers, joysticks, remote controls, automobiles, printers, headsets, monitors, etc.

Processor 210 may be programmed to carry out these self-diagnostic functions in a well-known manner readily apparent to those having ordinary skill in the art. Memory 250 and data storage device 295 are operatively coupled to processor 210 and serve to store, among other things, program code executed by processor 210 to carry out the operating functions of portable electronic device 200. Data storage device 295 and memory 250 each comprise a tangible non-transitory computer readable storage medium. Data storage device 295, and memory 250, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Display 220 is coupled to processor 210 via display driver(s) 230 and display 220 may be any type of display suitable for a portable device application such as a liquid crystal display (LCD) or organic light emitting diode (OLED) display. Display 220 is operable to display self-diagnostic instructions, data and/or other information relating to the ordinary operations of portable electronic device 200. For example, display 220 may show a set of instant messages to a user which are communicated over a wireless communications network (not shown) in a well-known fashion such communications facilitated by transceiver 280 and antenna 290. Display 220 may be a touch screen display or portable electronic device may be optionally configured to include a physical or soft keypad (e.g., keypad 240). Communications from or to portable electronic device 200 are further enabled by data communications subsystem 260 and communications port 270 for communicating with other devices via a network (e.g., a wireless communications network) or communications protocol (e.g., Bluetooth®). For example, data communications subsystem 260 may be a receiver, transceiver or modem for exchanging wired or wireless communications in any number of well-known fashions.

In accordance with an embodiment, self-diagnostic support device 100 further includes kinetic energy harvester 150 (e.g., a piezoelectric energy harvesting device) and energy buffer 170 (e.g., a high-capacity capacitor) which in well-known manner may be used to collect and store impact energy (e.g., from an impact on or to portable electronic device 200) for powering portable electronic 200. In accordance with an embodiment, kinetic energy harvester 150 is configured with at least one omnidirectional g-force sensor for sensing the impact(s)/shock(s) to portable electronic device. This is particularly effective if portable electronic device 200 is a low power device and experiences a depleted power condition or when external power sources are unavailable.

In accordance with an embodiment, the self-diagnostics may be automatically performed by self-diagnostic support device 100 to remedy the fault on portable electronic device 200. For example, removing or repairing corrupted operational code that drives the performance of portable electronic device 200. In accordance with a further embodiment, portable electronic device 200 will upon activation of the self-diagnostics initiate either routine maintenance operations to prevent future faults (i.e., assessing the probability that a fault may occur based on current device operating conditions) in accordance with at least one preventive self-diagnostic instruction or, in the event of a fault, initiate self-repair routines to correct or recover from the fault in accordance with at least one self-diagnostic instruction. In these situations, when portable electronic device 200 is subjected to a fault it will broadcast at least one diagnostic message to other hardware devices proximate to portable electronic device 200 (e.g., via a Bluetooth® ad-hoc network) and these other hardware devices (which may be the same type of device or different type of device) which are similarly equipped as shown in FIG. 1 and FIG. 2 will receive the diagnostic message and broadcast back a message that will include one or more potential solutions to recover from the fault or an indication that no solution is available.

In accordance with an embodiment, kinetic generator 110 is a directional sensor is able to determine the direction and/or the strength of a particular shock force to portable electronic device 200 by and through self-diagnostic support device 100. That is, the directional sensor is specifically looking for a stochastic or coherent force application to portable electronic device 200. Further, the kinetic generator 110 may be equipped with one or more buffers or have access to a memory (e.g., memory 160) to retain a history of past force application(s) to portable electronic device 200 which will be useful in distinguishing between inadvertent and intentional applications of force in accordance with the embodiments herein. In this way, portable electronic device 200 is constantly monitored (by and through self-diagnostic support device 100) for the application of any force (e.g., exceeding a specified threshold) including but not limited to impact strength/force level, direction, orientation, and/or torque/rotation, to name just a few. Illustratively, the force threshold, if any, can be specified at the time of manufacture or by the user of portable electronic device 200 (including based on any past force history, as discussed above).

In further embodiments, a user of portable electronic device 200 may be prompted (e.g., on display 220) with a list of one or more solutions which may be in priority (i.e., more likely to succeed) order and queried whether the user desires to have one of the identified solutions performed by portable electronic device 200. Alternatively, the user may be prompted with the list of one or more solutions and queried whether the user desires to directly perform one of the identified solutions. For example, the user might elect to perform an identified solution via a web portal interface provided by and through data communications subsystem 260 and/or transceiver 180.

Figure 3:
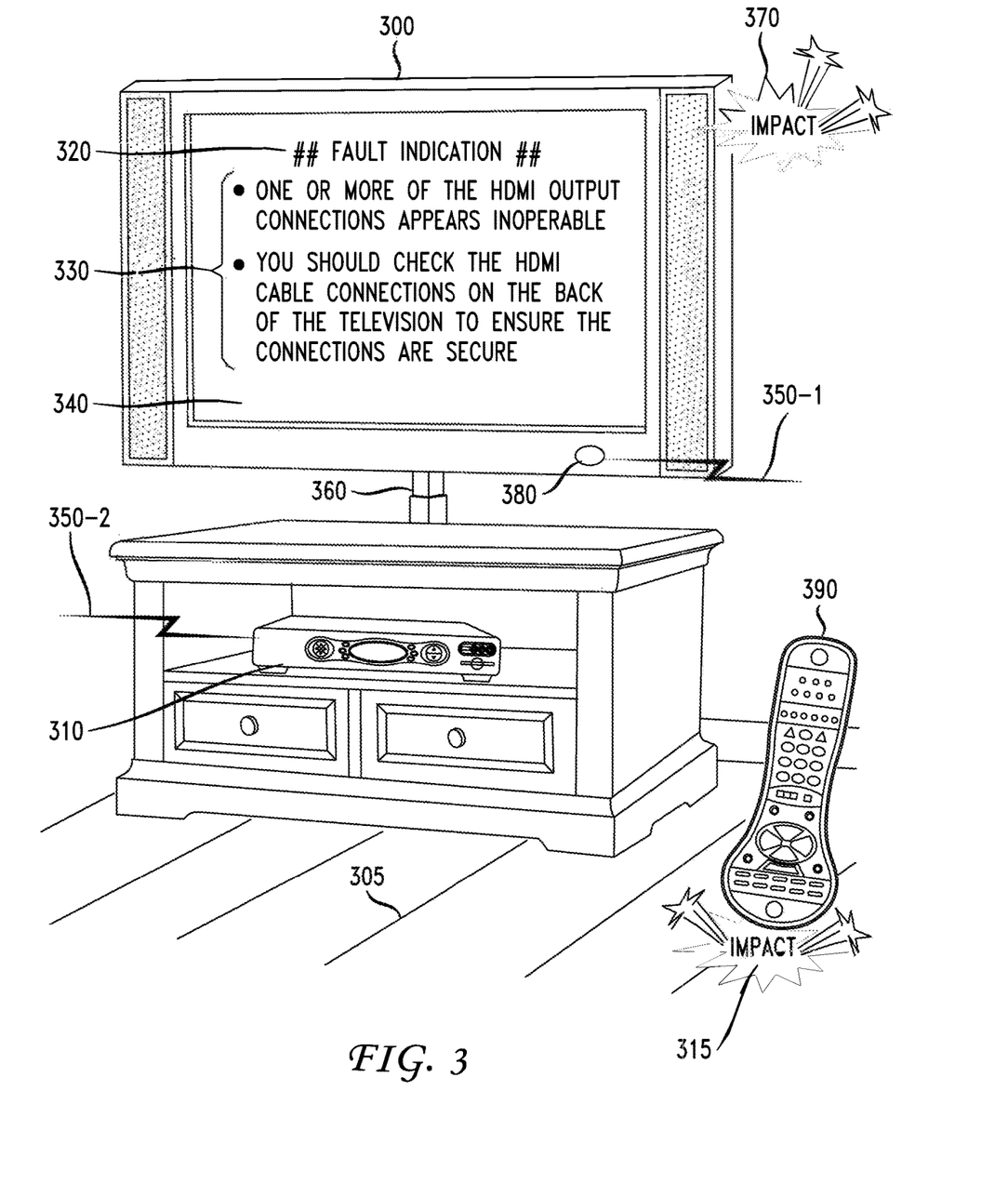
FIG. 3 illustrates an exemplary self-diagnostic enabled interactive television device, exemplary self-diagnostic enabled set-top box, and exemplary self-diagnostic enabled remote control, each configured in accordance with FIG. 1 and FIG. 2 for delivering kinetically activated self-diagnostics in accordance with an embodiment.

FIG. 3 illustrates on exemplary self-diagnostic enabled interactive television device 300, exemplary self-diagnostic enabled set-top box 310, and exemplary self-diagnostic enabled remote control 390, each configured in accordance with FIG. 1 and FIG. 2 for delivering kinetically activated self-diagnostics in accordance with an embodiment. As shown, self-diagnostic enabled interactive television device 300 has received an indication (as displayed on display 340) of fault 320 related to a potential or actual fault detected in accordance with the self-diagnostics launched and performed by interactive television device 300 in accordance with the embodiment, as described herein above. Illustratively, interactive television device 300 may have been subjected to impact 370 (which may be any type of impact, vibration, shock, sudden movement or being jostled about stand 360), and remote control 390 may have been subjected to impact 315 (which may any type of impact, vibration, shock, or sudden movement, for example, from being dropped and making contact with surface 305). For example, kinetic generator 110 senses different levels or measurements of vibration associated with impact 370 and/or impact 315. The vibrations may be random or cyclic motion, perhaps in one or more axes. Regardless, kinetic generator 110 outputs a digital or analog signal (e.g., amplitude, frequency, voltage, current, pulse width) that is indicative of impact 370 to which interactive television device 300 has been subjected to, and/or impact 315 by remote control device 390 has been subjected to. As noted previously, kinetic generator 110 is any device that converts a vibration, shock or motion, to electric current. In accordance with the embodiment, the sensing of impact 370 by interactive television device 300 and/or impact 315 to which remote control device 390 immediately triggers the self-diagnostics, as described herein above, for determining the presence or absence of a known fault, or the probability of the occurrence of a future fault based on current device operating conditions.

Illustratively, fault 320 indicates that an HDMI cable connection may be or is faulty and the user (not shown) should investigate and perform, depending upon the result of the investigation, one or more of the suggested diagnostic instructions 330 to prevent or resolve fault 320. Diagnostic instructions 330 may be sourced and provided directly by interactive television 300, or in accordance with a further embodiment, when interactive television 300 is subjected to a fault it will broadcast using wireless transceiver 380 at least one diagnostic message 350-1 to other hardware devices proximate to interactive television 300 (e.g., via a Bluetooth® ad-hoc network), for example, other television sets in the user's home (not shown) and/or self-diagnostic enabled set-top box 310.

As such, these other hardware devices (which may be the same type of device or different type of devices) which are similarly equipped as shown in FIG. 1 and FIG. 2 will receive the diagnostic message and broadcast back a message that will include the fault identification and one or more potential solutions to recover from the fault or an indication that no solution is available. For example, instructions 330 may have been broadcast by set-top box 310 via broadcast message 350-2 and received by interactive television device 300.

Figure 4:
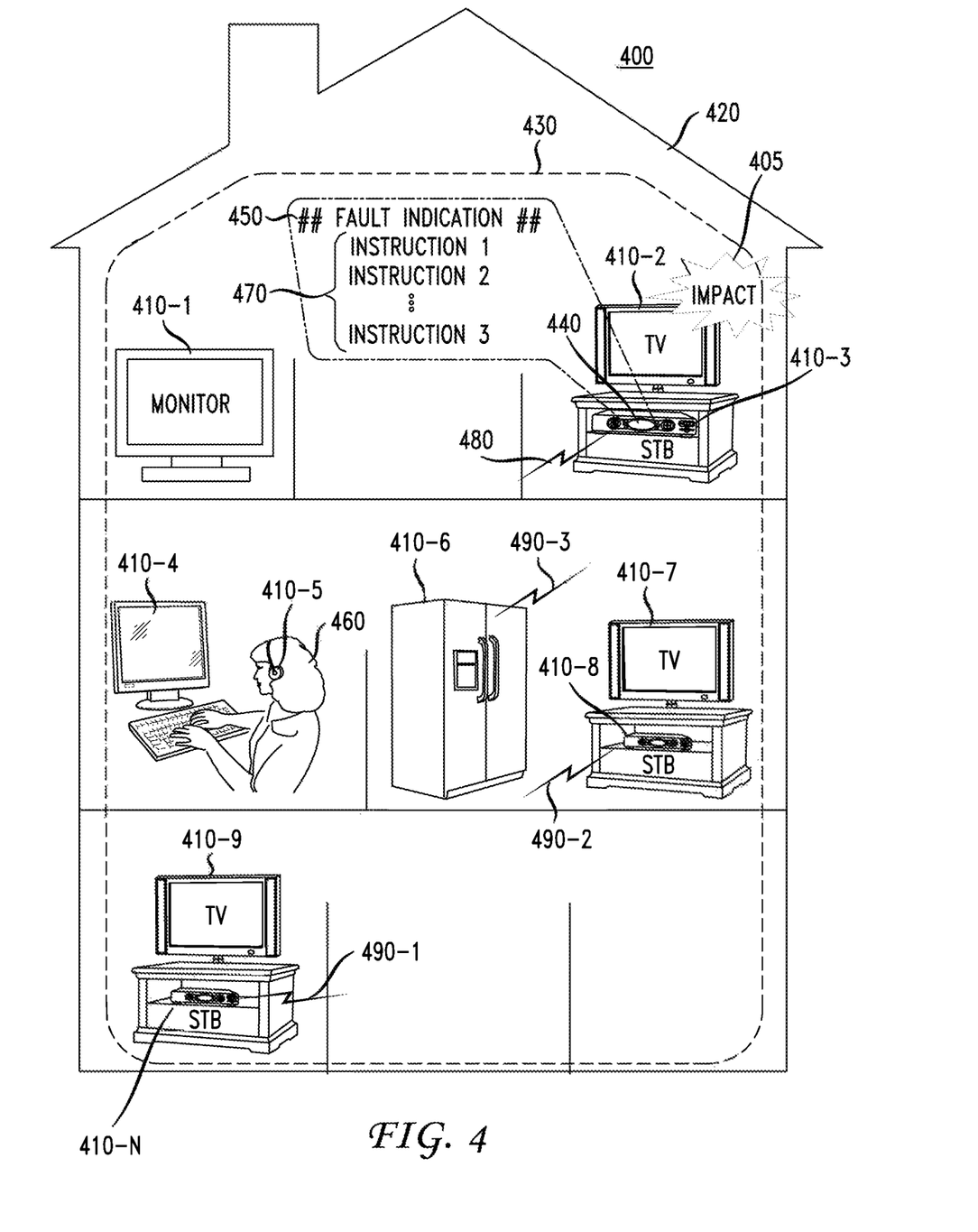
FIG. 4 shows an explanatory diagram of delivering kinetically activated self-diagnostics using multiple self-diagnostic enabled devices, each configured in accordance with FIG. 1 and FIG. 2, in accordance with an embodiment.

FIG. 4 shows explanatory diagram 400 for delivering kinetically activated self-diagnostics using multiple self-diagnostic enabled devices, each configured in accordance with FIG. 1 and FIG. 2, in accordance with an embodiment. In particular, the multiple self-diagnostic enabled devices, i.e., self-diagnostic enabled devices 410-1, 410-2, 410-3, 410-4, 410-5, 410-6, 410-7, 410-8, 410-9 through 410-N are installed, in a well-known manner, in various locations throughout home 420 and exchange communications over communications interface 430, for example, communications interface 430 may be a well-known Bluetooth® ad hoc network established by and among self-diagnostic enabled devices 410-1 through 410-N, or any other type of well-known networking or communication environments such as Wi-Fi, LTE/CDMA/GSM or other cellular standards, or radio bands.

For example, self-diagnostic enabled device 410-3 (illustratively, a set-top box) has received, in accordance with an embodiment, an indication (as displayed on display 440) of fault 450 related to a potential or actual fault detected in accordance with the self-diagnostics launched and performed by self-diagnostic enabled device 410-3 given its configuration in accordance with FIG. 1 and FIG. 2 to enable the kinetic delivery of self-diagnostics, as described herein above. Illustratively, self-diagnostic enabled device 410-3 may have been subjected to a large impact or been suddenly moved or jostled (e.g., by impact 405). Here, for example, fault 450 may indicate that an Ethernet connection may or is faulty and user 460 should investigate and perform, depending upon the result of the investigation, one or more of the suggested self-diagnostic instructions 470 to prevent (i.e., a preventive self-diagnostic instruction) or resolve fault 450 (i.e., a self-diagnostic instruction). As used herein, preventive-self-diagnostic instructions are referred to as those instructions that prevent future faults, and self-diagnostic instructions are referred to as those instructions that prevent current/actual faults. For ease of reference, they are also collectively referred to herein as self-diagnostic instructions depending on the context.

Self-diagnostic instructions 470 may be sourced and provided directly by self-diagnostic enabled device 410-3, or in accordance with a further embodiment, when self-diagnostic enabled device 410-3 is subjected to a fault it will broadcast, for example, using a wireless transceiver (not shown) at least one diagnostic message 480 to other hardware devices proximate thereto via communications interface 430, for example, self-diagnostic enabled devices 410-2, 410-4, 410-5, 410-6, 410-7, 410-8, 410-9 through 410-N. As such, these other hardware devices which may be the same type of device (e.g., self-diagnostic enabled devices 410-1 and 410-N are both set-top boxes) or different type of devices (e.g., self-diagnostic enabled device 410-1 is a flat screen monitor, self-diagnostic enabled device 410-2 is a flat screen television, self-diagnostic enabled device 410-4 is a computer, and self-diagnostic enabled device 410-6 is a "smart" refrigerator), which are similarly equipped as shown in FIG. 1 and FIG. 2 will receive diagnostic message 480 and broadcast back a message (e.g., broadcast messages 490-1, 490-2, and 490-3) that will include one or more potential solutions to recover from the fault or an indication that no solution is available. For example, self-diagnostic instructions 470 may have been broadcast by self-diagnostic enabled device 410-6 via broadcast message 490-3 and received by self-diagnostic enabled device 410-3.

Figure 5:
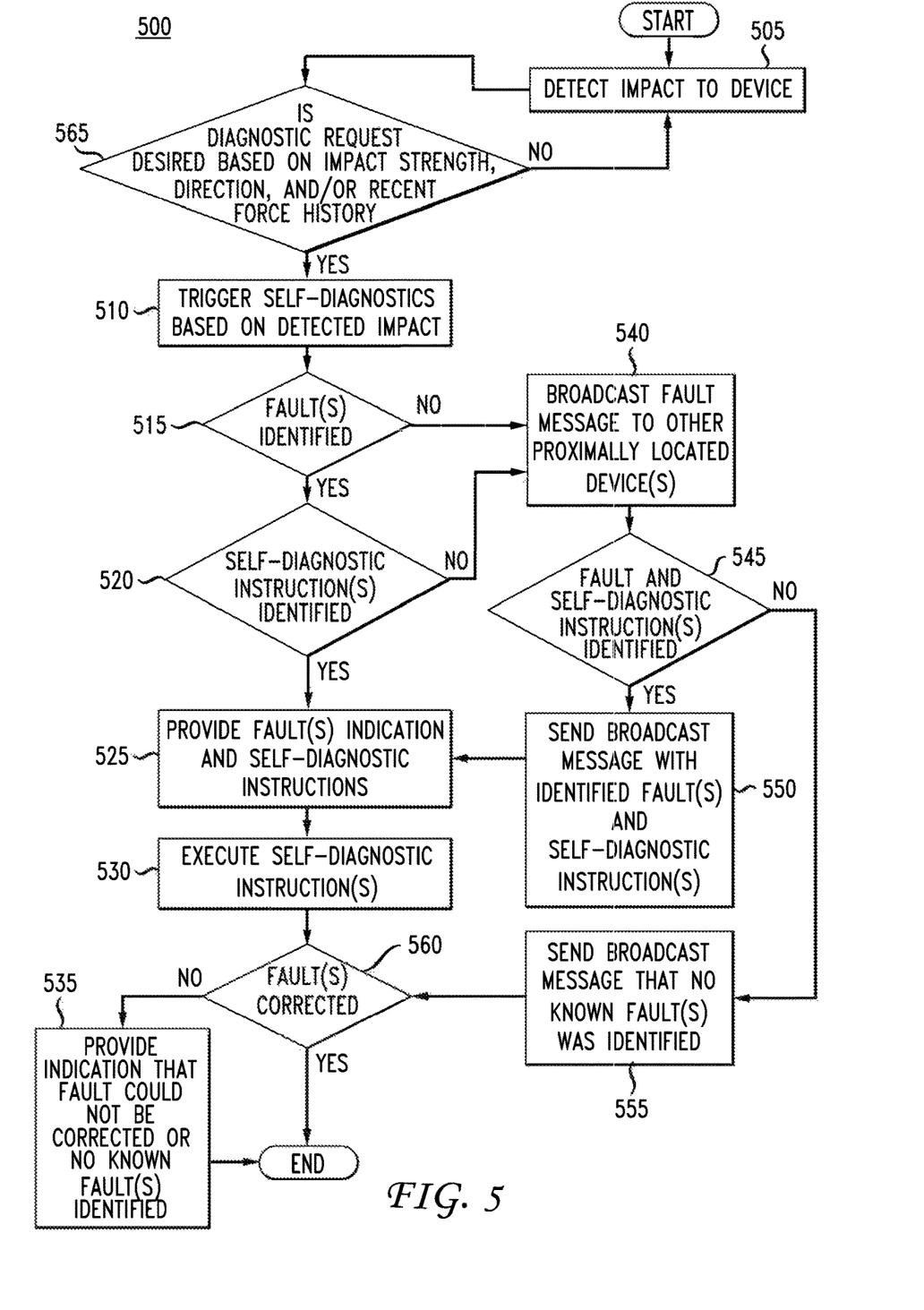
FIG. 5 shows a flowchart of illustrative operations for kinetically activated self-diagnostics in accordance with an embodiment.

FIG. 5 shows a flowchart of illustrative operations 500 for providing kinetically activated self-diagnostics in accordance with an embodiment. In accordance with the operations of FIG. 5, at step 505, an impact to a device (e.g., portable electronic device 200) is detected, illustratively, by kinetic generator 110 as detailed above, and a determination is made, at step 565, if a diagnostic request is desired based on the detected impact in terms of at least the impact strength, direction, and/or recent force history. In this way, the device is constantly monitored for the application of any force including but not limited to whether the force exceeds a specified threshold, for example, as detailed above. Based on the detection of the impact and the determination regarding the desirability of the diagnostic request, at step 510, self-diagnostics are triggered in the device to identify a particular fault(s), at step 515, that the device may be or is subjected to which may adversely impact the performance thereof. In accordance with the embodiment, if the self-diagnostics of the device identifies the fault, one or more self-diagnostic instructions are identified, at step 520, such instructions are provided (at step 525) to the user, for example, and executed at step 530 in an attempt to correct the identified fault, as detailed above. A determination is made, at step 560, whether the fault is corrected and if not corrected, an indication is provided, at step 535, that no known fault was identified. Otherwise, the identified fault has been corrected by the executed self-diagnostic instructions and the device is restored to normal operations and the self-diagnostic operations ended.

If the self-diagnostics in the device are unsuccessful in identifying the fault from sources resident in the device, one or more broadcast messages are sent, at step 540, from the device to other devices proximally located thereto as detailed above. If one of these proximally located devices is able to identify the fault and self-diagnostic instruction(s), at step 545, this device will broadcast a message, at step 550, that identifies the fault and such self-diagnostic instruction(s), or if the proximally located devices are unable to identify the fault and associated self-diagnostic instructions a broadcast message, at step 555, is sent indicating that result. These broadcast messages will be received, as detailed above, by the original device (i.e., the device triggering and undergoing self-diagnostics) which such will provide the indication of the identified fault and self-diagnostic instruction(s), at step 525, to the user, for example, and execute (at step 530) such instructions in an attempt to correct the identified fault, as detailed above. A determination is made, at step 560, whether the fault is corrected and if not corrected, an indication is provided, at step 535, that no known fault was identified. Otherwise, the identified fault has been corrected by the executed self-diagnostic instructions and the device is restored to normal operations and the self-diagnostic operations ended.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
   detecting an impact to a device;
   determining whether to perform a self-diagnostic based on the impact and a force history of a prior impact, the self-diagnostic comprising:
   determining that a fault has occurred in the device; and
   after determining that the fault has occurred:
   identifying a type of the fault; and
   determining a self-diagnostic instruction that will resolve the fault based on the type of the fault.

2. The method of claim 1, further comprising:
   executing, by the device, the self-diagnostic instruction.

3. The method of claim 2, further comprising:
   displaying an indication of the type of the fault and the self-diagnostic instruction via a display of the device.

4. The method of claim 1, wherein the determining whether to perform the self-diagnostic is further based on the impact detected exceeding a specified threshold.

5. The method of claim 4, wherein detecting the impact to the device comprises detecting at least one of an impact strength, an impact direction, or a rotation.

6. The method of claim 1, further comprising:
   determining whether a condition exists on the device that will promote a future fault at a later time; and
   determining a preventative self-diagnostic instruction that will prevent the future fault from occurring in response to determining that the condition exists on the device.

7. The method of claim 6, further comprising:
   executing, by the device, the preventative self-diagnostic instruction.

8. A device, comprising:
   a processor;
   a memory coupled with the processor, the memory storing computer program instructions that when executed cause the processor to perform operations comprising:
   detecting an impact to the device based on an output from a kinetic generator;
   determining whether to perform a self-diagnostic based on the impact and a force history of a prior impact, the self-diagnostic comprising:
   determining that a fault has occurred in the device; and
   after determining that the fault has occurred:
   identifying a type of the fault; and
   determining a self-diagnostic instruction that will resolve the fault based on the type of the fault.

9. The device of claim 8, the operations further comprising:
   executing the self-diagnostic instruction.

10. The device of claim 9, the operations further comprising:
    displaying an indication of the type of the fault and the self-diagnostic instruction via a display of the device.

11. The device of claim 8, wherein the determining whether to perform the self-diagnostic is further based on the impact detected exceeding a specified threshold.

12. The device of claim 11, wherein detecting the impact to the device comprises detecting at least one of an impact strength, an impact direction, or a rotation.

13. The device of claim 8, the operations further comprising:
    determining whether a condition exists on the device that promote a future fault at a later time; and
    in response to determining that the condition exists on the device, determining a preventative self-diagnostic instruction that will prevent the future fault from occurring.

14. The device of claim 13, the operations further comprising:
    executing the preventative self-diagnostic instruction.

15. A non-transitory computer readable medium storing computer program instructions, which, when executed on a processor, cause the processor to perform operations comprising:
- detecting an impact to a device;
- determining whether to perform self-diagnostics based on the impact and a force history of a prior impact, the self-diagnostics comprising:
- determining that a fault has occurred in the device; and
- after determining that the fault has occurred:
  - identifying a type of the fault; and
  - determining a self-diagnostic instruction which will resolve the fault based on the type of the fault.

16. The non-transitory computer readable medium of claim 15, the operations further comprising:
- executing, by the device, the self-diagnostic instruction.

17. The non-transitory computer readable medium of claim 16, the operations further comprising:
- displaying an indication of the type of the fault and the self-diagnostic instruction via a user interface of the device.

18. The non-transitory computer readable medium of claim 15, wherein the determining whether to perform the self-diagnostics is further based on the impact detected exceeding a specified threshold.

19. The non-transitory computer readable medium of claim 18, wherein detecting the impact to the device comprises detecting at least one of an impact strength, an impact direction, and a rotation.

20. The non-transitory computer readable medium of claim 15, the operations further comprising:
- determining whether a condition exists on the device which will promote a future fault at a later time;
- determining a preventative self-diagnostic instruction which will prevent the future fault from occurring in response to determining that the condition exists on the device; and
- executing the preventative self-diagnostic instruction.

* * * * *